Patented Aug. 17, 1937

2,090,577

UNITED STATES PATENT OFFICE 2,090,577

MOLDING COMPOSITION

Edward R. Dillehay, Glen Ellyn, Ill., assignor to The Richardson Company, Lockland, Ohio, a corporation of Ohio No Drawing. Application January 10, 1934, Serial No. 706,151

5 Claims. (Cl. 106—2)

My invention relates to a certain new and useful composition for molding, particularly for molding of storage battery cases having integral cell forming partitions therein.

The effort in connection with such molding compositions and molded products therefrom, is to decrease the absorption into the compositions of acid, without sacrificing the strength of the product and without sacrificing the freedom from attack by acid of the ingredients employed in the composition.

It is the object of my invention to provide such a composition as will have a lower absorption of acid of the type and concentrations used in storage battery practice, than has been obtainable hitherto, while at the same time maintaining strength and making the product of ingredients which are, if anything, more resistant to attack and decomposition by the acid than those hitherto employed.

The new ingredient which I use, which has not heretofore been employed in connection with such compositions, is a filamentary glass which has but recently come on the market. This product is a true glass in what may be termed spun form, and has been used for decoration, for insulation, and for absorption of foreign matter from air and other gases. The product which I prefer is known to the trade as glass cotton, although there are several types of filamentary glass which can be employed.

The use of cotton linters as an element of such compositions when adequately incorporated and fully protected by the asphaltic binder in connection with acid resistant mineral matter, of fibrous or non-fibrous form, was taught in U. S. Letters Patent No. 1,752,917, dated April 1, 1930. Filamentary glass, when used with the typical asphaltic binders employed in storage battery case compositions, cannot be substituted entirely for the fibrous mineral matter or mineral filler which has hitherto been used, because of its non-absorption of the binder, as will be more fully described below.

I find that if the sole ingredient used with the asphaltic binder is filamentary glass, the composition will be impractical to handle in the molding operation, because it will be either too soft and mushy to handle in making separate mold charges, or too hard, if permitted to cool before handling, there being no intermediate point which can be readily reached for an entire mixer charge to make it practical to attain proper consistency for handling by control of temperature within the narrow limits necessary.

Furthermore, I find that even if such a composition is molded, that this same lack of absorption of the binder into the glass will result in a very decided tendency of the product to swell and thus absorb acid, at temperatures reached when charging or over-charging a battery, even though there is no soluble matter in the glass itself, which the acid can attack.

Thus I find it necessary, in making a molding composition of the type noted, to employ with the usual binders hitherto found acceptable from a use standpoint, not only the filamentary glass, but also an absorbent mineral matter or organic fiber, which will serve to take up enough of the binder to avoid the defect noted.

As a mineral matter in this connection, I prefer to employ a diatomaceous earth which either in its natural state or prepared state, is almost entirely free from attack by storage battery acid under extreme conditions of use. This mineral matter is sufficiently absorbent to satisfy the requirements, when used in sufficient quantities. Also, I can employ and prefer to employ where organic fiber is desired, cotton linters of a good clean quality.

In amount of glass which is used in the composition, the fibrous nature thereof is not such that it will, so far as my work has demonstrated, and with the usual methods of mixing, result in the final molded product of filaments of any substantial length. For this reason, and also because the filaments are relatively fragile, a larger quantity must be used than is possible with cotton linters as strength giving elements to the molding composition. The upper limit of use with binders of the type found satisfactory hitherto is such, that it will still be permitted to add sufficient absorbent mineral matter or cotton linters or other organic fiber as will give the required solidity for handling, and freedom from tendency to swell when exposed to hot storage battery acid.

I have formed satisfactory storage battery cases in the usual asphaltic composition molds and using accepted techniques of thorough mixing, preferably that of the Lukens patent above referred to, of the following compositions. These examples are given for purposes of illustration, and may be varied without departing from a satisfactory product.

The binder which I have employed, which is typical of ones used in this art, is one using gilsonite around 50% and petroleum asphalt 50% of around 160 to 170 melt point (Ball and Ring), the final composition having a Ball and Ring melt point of around 260 degrees Fahrenheit and a penetration at 150 degrees Fahrenheit, 5 seconds, 100 grammes of about 12.

The mineral matter is a calcined diatomaceous earth known to the trade as dicalite.

The organic fiber is cotton linters, and the filamentary glass is glass cotton.

These, of course, are not exclusive ingredients, and are merely set forth as the ones which I employ in testing my invention.

The compositions tested by me and found to satisfy the objects of my invention were the following:

1. Binder 52%, dicalite 26%, glass cotton 16.2%, cotton linters 5.8%.
2. Binder 55%, dicalite 10%, glass cotton 35%.
3. Binder 45%, dicalite 20%, glass cotton 35%.
4. Binder 48%, dicalite 20%, glass cotton 30%, cotton linters 2%.
5. Binder 49%, dicalite 17%, glass cotton 30%, cotton linters 4%.

In making these compositions, the binder, heated to semi-liquid consistency, was mixed with the dicalite, then the linters, if used, was added, and finally the glass cotton. This was to avoid too prolonged a mixing with the glass cotton. A W. P. mixing machine of the usual type was employed. When the mixing was complete, the mixer charge was easy to handle in batches with the gloved hand, and was weighed out in suitable charges for molding storage battery cases.

Without using linters, my work has indicated that there should be at least 10% of mineral matter of absorbent nature with relation to the binder, using the standard types of asphaltic binders. Where no cotton linters are used, I find that to gain the strength which is lost by omission of the linters, around three times as much of the glass should be employed to take the place of the omitted linters.

I prefer not to use more than around five or six per cent of the linters in any event, so as to obtain good resistance to acid.

Where the linters are not used, it is not practical, with accepted types of binders, to use nothing but glass cotton because of the necessity of absorbent ingredients.

Within the above stated limits, the percentages which can be used with success may vary rather widely, depending upon the cost of the ingredients, and the power cost for incorporating them, and on the amount of strength in the final product that is desired.

The molding of the product under heavy pressure while same is hot, is done in the usual way practiced in the industry, by inserting mold charges into the hollow portion of the mold and thrusting the plunger portion thereinto.

Having thus described my invention, what I claim to be the novelty therein I have set forth in the appended claims. What I claim is:

1. A moldable battery box composition for the purpose described, which consists in asphalt binder, filamentary glass not in excess of 40%, and acid resistant mineral matter of absorbent character not less than 10%.

2. A moldable battery box composition for the purpose described, in which asphaltic binder, acid-resistant absorbent mineral matter, and organic fiber are intermixed, with some of the organic fiber replaced by filamentary glass in proportion of around three times the organic fiber replaced.

3. The process of making a molding composition for battery boxes, which comprises mixing with a thermo-plastic bituminous binder heated to semi-liquid consistency, an acid-resistant absorbent mineral matter sufficient to absorb a large proportion of the binder, prolonging the mixing for thorough combination of the binder and mineral matter, then adding filamentary glass in proportion to afford adequate strength to the completed composition, and continuing the mixing for a much shorter period of time, to incorporate the filamentary glass with the binder and absorbent mineral matter without excessively impairing the fiber length of the filamentary glass.

4. The process as set forth in claim 3, in which, intermediate of the step of mixing in the absorbent mineral matter and the step of mixing in the filamentary glass, a minor proportion of organic fiber is mixed into the mixture.

5. A moldable battery box composition comprising filamentary glass, organic fiber, diatomaceous earth and a bituminous binder.

EDWARD R. DILLEHAY.